(12) United States Patent
Schulz

(10) Patent No.: US 11,262,567 B2
(45) Date of Patent: Mar. 1, 2022

(54) CORRECTION OBJECTIVE FOR A MICROSCOPE

(71) Applicant: Leica Microsystems CMS GmbH, Wetzlar (DE)

(72) Inventor: Christian Schulz, Solms (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 152 days.

(21) Appl. No.: 16/605,775

(22) PCT Filed: Apr. 20, 2018

(86) PCT No.: PCT/EP2018/060149
§ 371 (c)(1),
(2) Date: Oct. 16, 2019

(87) PCT Pub. No.: WO2018/193076
PCT Pub. Date: Oct. 25, 2018

(65) Prior Publication Data
US 2021/0011268 A1    Jan. 14, 2021

(30) Foreign Application Priority Data

Apr. 21, 2017 (DE) ..................... 10 2017 108 593.9

(51) Int. Cl.
*G02B 21/02* (2006.01)
*G02B 15/14* (2006.01)
*G02B 21/04* (2006.01)

(52) U.S. Cl.
CPC ... *G02B 21/025* (2013.01); *G02B 15/143103* (2019.08); *G02B 21/04* (2013.01)

(58) Field of Classification Search
CPC .... G02B 21/025; G02B 21/22; G02B 21/365; G02B 21/0076; G02B 21/361;
(Continued)

(56) References Cited

U.S. PATENT DOCUMENTS

| 5,940,220 | A | 8/1999 | Suenaga et al. |
| 7,663,807 | B2 | 2/2010 | Yonetani |
| 8,705,178 | B2 | 4/2014 | Fujita |
| 2003/0165021 | A1* | 9/2003 | Kawasaki ............ G02B 21/025 359/690 |
| 2004/0246592 | A1* | 12/2004 | Suzuki ................ G02B 15/173 359/642 |

(Continued)

FOREIGN PATENT DOCUMENTS

| DE | 102004051357 A1 | 4/2006 |
| DE | 102010039746 A1 | 3/2021 |

(Continued)

OTHER PUBLICATIONS

International Search Report from PCT/EP2018/060149, filed Apr. 20, 2018, dated Jul. 9, 2018.

*Primary Examiner* — William R Alexander
*Assistant Examiner* — Sharrief I Broome
(74) *Attorney, Agent, or Firm* — Patentbar International, P.C.

(57) ABSTRACT

The invention relates to a correction objective (10), comprising a first lens group (12) of positive optical power, a second lens group (14) of positive optical power, a third lens group (16) of negative optical power, and a fourth lens group (18) of positive optical power, which are arranged in this order from the object side, the second lens group (14) being movable along the optical axis (O) in such a way that the sum of the distance (V1) between the second lens group (14) and the first lens group (12) and the distance (V2) between the second lens group (14) and the third lens group (16) is constant. The image scale of the second lens group (14) lies in a range of −0.9 to −1.1.

11 Claims, 2 Drawing Sheets

(58) Field of Classification Search
CPC .. G02B 21/0012; G02B 21/18; G02B 21/248; G02B 21/04; G02B 21/06; G02B 21/16; G02B 21/367; G02B 21/002; G02B 21/0032; G02B 21/008; G02B 21/0088; G02B 21/241; G02B 21/0072; G02B 26/0833; G02B 21/082; A61B 90/20; A61B 90/50; A61B 10/0012; A61B 1/0008; A61B 1/00108; A61B 1/00149; A61B 1/00172; A61B 1/00188; A61B 1/00195; A61B 1/04; A61B 1/0676; A61B 1/0684; A61B 1/303; A61B 1/32; A61B 2010/0025; A61B 2017/00544; A61B 2017/00911; A61B 34/25; A61B 90/25; A61B 90/36
See application file for complete search history.

(56) References Cited

U.S. PATENT DOCUMENTS

2006/0087745 A1* 4/2006 Fahlbusch .......... G02B 27/0068
                                                    359/656
2006/0279847 A1   12/2006 Matthae et al.
2013/0222920 A1    8/2013 Fujita
2017/0347867 A1* 12/2017 Sato .................. G02B 23/243
2019/0377168 A1* 12/2019 Umeda ............... H04N 5/23296

FOREIGN PATENT DOCUMENTS

EP        2017663 A2 *  1/2009 ........ G02B 21/0032
EP        2017663 A2    1/2009
JP     2010-048841 A    3/2010

* cited by examiner

CORRECTION OBJECTIVE FOR A MICROSCOPE

RELATED APPLICATIONS

This Application is a U.S. National Stage Under 35 USC § 371 of International Application PCT/EP2018/060149, filed on Apr. 20, 2018, which in turn claims priority to German Patent Application DE 10 2017 108 593.9, filed Apr. 21, 2017, both of which are incorporated herein by reference in their entirety.

FIELD OF THE INVENTION

The invention relates to a corrective objective for a microscope with a first lens group with positive refractive power, a second lens group with positive refractive power, a third lens group with negative refractive power and a fourth lens group with positive refractive power, arranged in this order from the object side, wherein the second lens group can be moved along the optical axis in such a way that the sum of the distance between the second lens group and the first lens group and the distance between the second lens group and the third lens group is constant.

BACKGROUND OF THE INVENTION

With current technology, there are certain corrective objectives for microscopes which allow an operator to correct aberrations caused by variable optical properties of the sample area. These aberrations include spherical aberration resulting from variations of the cover slip thickness or inhomogeneities in the biological structure of the specimen to be observed. Large spherical aberration occurs particularly with lenses having a high numerical aperture, large variation in cover slip thickness, and high refractive index differences in the specimen.

U.S. Pat. No. 8,705,178 B2 refers to a corrective objective for a microscope which comprises a first lens group with positive refractive power, a second lens group with positive refractive power, a third lens group with negative refractive power, and a fourth lens group with positive refractive power, arranged in this order from the object side. The second lens group constitutes a corrective element which can be moved along an optical axis to correct the spherical aberration caused by, for example, variations in cover slip thickness. This second lens group has a refractive power approximately equal to or greater than the total refractive power of the corrective lens.

The disadvantage of this corrective objective, however, is that the position of the paraxial focus changes when moving the second lens group. Consequently, an operator has to correct the focal position along with the spherical aberration to get a sharp image of the sample. Paraxial focus will hereinafter refer to the object-facing focal point in the paraxial approximation.

Another corrective objective, which also has just a single corrective element which can be moved along the optical axis, is known from U.S. Pat. No. 5,940,220. In contrast to the aforementioned corrective objective, the refractive power of the movable corrective element along the optical axis is small compared to the total refractive power of the corrective objective. The correction results from the position of the corrective element within a divergent or convergent optical path, which can be varied by shifting the corrective element. The disadvantage of the comparatively low refractive power of the corrective element is the need for a lengthy lens to achieve a large corrective effect. Also, the diameter of the lens increases with its length, which can be a detrimental to many microscopy applications.

Finally, DE 10 2004 051 357 A1 discloses a corrective objective used as an immersion objective wherein several lens groups are moved in order to correct the spherical aberration. This structure is characterized by a high level of mechanical complexity, which leads to high production costs and an increased susceptibility to repairs.

SUMMARY OF THE INVENTION

In view of the current art, it is the object of the invention to provide a simple and compact corrective objective allowing an operator to correct the spherical aberration without changing the position of the paraxial focus.

This object is achieved with a corrective objective for a microscope, comprising a first lens group with positive refractive power, a second lens group with positive refractive power, a third lens group with negative refractive power, and a fourth lens group with positive refractive power, arranged in this order from the object side, wherein the second lens group can be moved along the optical axis in such a way that the sum of the distance between the second lens group and the first lens group and the distance between the second lens group and the third lens group is constant, wherein the magnification of the second lens group ranges between −0.9 and −1.1.

According to the invention, the second lens group, which constitutes the corrective element and is therefore movable along the optical axis, has a magnification within the range around −1. The magnification determines the image size-to-object size ratio with respect to the second lens group. On one hand, the choice of magnification according to the invention leads to the focal adjustment being largely unaffected by the corrective setting. On the other hand, a high enough refractive power can be chosen for the second lens group to ensure a compact design of the corrective objective. Furthermore, the corrective objective described in the invention only contains a single movable corrective element, reducing the mechanical complexity of the structure.

In the recommended design, the refractive power $D_2$ of the second lens group is between one tenth and one third of the total refractive power $D$ of the corrective objective:

$$\tfrac{1}{10}D < D_2 < \tfrac{1}{3}D.$$

On the one hand, the refractive power of the second lens group in relation to the total refractive power is small enough for its influence on the position of the paraxial focus to be largely negligible. On the other hand, the refractive power of the second lens group is large enough for a compact lens design, in particular a small overall length of the lens, while still achieving a sufficient corrective effect.

In another preferred embodiment, the first lens group comprises a first lens with negative refractive power, preferably a meniscus lens, and a second lens with positive refractive power, preferably a biconvex lens, which are arranged in this order from the object side. This design allows for a large numerical aperture, which is desirable in most microscopy applications.

The preferred embodiment of the second lens group comprises a third lens with positive refractive power, a fourth lens with negative refractive power, and a fifth lens with positive refractive power to be arranged in this order from the object side and grouted together. The design of the second lens group, which can be moved along the optical axis as a grouted element, simplifies the mechanical structure of the corrective objective since only a single lens element is movable.

In a particularly preferred embodiment, the third lens and the fifth lens are biconvex lenses, while the fourth lens is a biconcave lens.

In another preferred embodiment, the third lens group comprises a sixth lens with positive refractive power, preferably a biconvex lens, and a seventh lens with negative refractive power, preferably a biconcave lens, arranged in this order from the object side and grouted together. Due to the design as a grouted element, the third lens group, in particular, can be implemented as an achromat in order to correct chromatic aberration.

In another preferred embodiment, the fourth lens group comprises an eighth lens with negative refractive power and a ninth lens with positive refractive power, arranged in that order from the object side. The eighth lens and the ninth lens are both designed as meniscus lenses according to a particularly preferred embodiment.

In an advantageous further developed embodiment, the corrective objective has a control element to move the second lens group along the optical axis. The control element can be, for example, a manually operable knurled ring, whose rotation is converted into a longitudinal movement of the second lens group by means of a gear mechanism.

The invention further contemplates a microscope with a corrective objective as described above.

BRIEF DESCRIPTION OF THE DRAWINGS

Other features and advantages of the invention will become apparent in the following description, which explains the invention along with the accompanying figures with reference to exemplary embodiments.

Wherein.

DETAILED DESCRIPTION OF THE PREFERRED EMBODIMENTS

Figure 1:
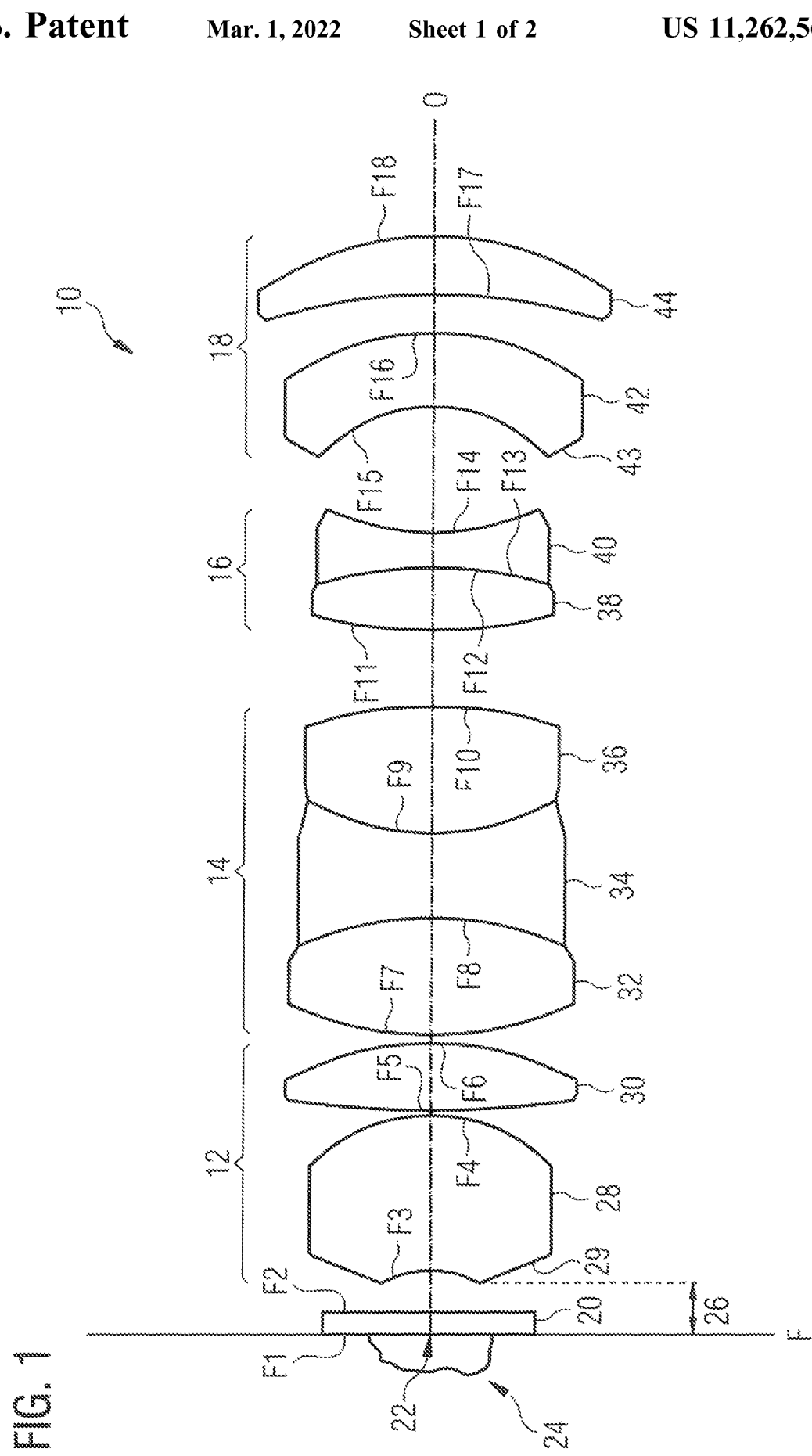
FIG. 1 shows a schematic sectional view of an exemplary embodiment of a corrective objective.

FIG. 1 shows an exemplary embodiment of a corrective objective 10 in a sectional view along the optical axis O.

The corrective objective 10 shown comprises a first lens group 12 with positive refractive power, a second lens group 14 with positive refractive power, a third lens group 16 with negative refractive power, and a fourth lens group 18 with positive refractive power arranged in this order from the object side (i.e. from the left in the figure). The second lens group 14 can be moved along the optical axis O to correct the spherical aberration. The first lens group 12, the third lens group 16, and the fourth lens group 18 are stationary.

The corrective objective 10 faces a cover slip 20, which has two plane surfaces F1 and F2. A sample 24 is disposed on plane F1. The cover slip 20 is located in a sample area 26. In FIG. 1, a focal plane F is defined, which is penetrated perpendicularly in a paraxial focus 22 by the optical axis O.

Viewed from the object side, the first lens group 12 comprises a first lens 28 with negative refractive power, an object-facing concave surface F3, and a convex surface F4 as well as a second lens 30 with positive refractive power with two convex surfaces F5 and F6. The first lens 28 has a chamfer 29 on the object side.

The second lens group 14 comprises, as viewed from the object side, a third positive lens 32 with two convex surfaces F7, F8, a fourth positive lens 34 with two concave surfaces F9, F10, and a fifth positive lens 36 which has two convex surfaces F11, F12. The image-side convex surface F8 of the third lens 32 and the object-side concave surface F9 of the fourth lens 34 as well as the image-side concave surface F10 of the fourth lens 34 and the object-side convex surface F11 of the fifth lens 36, respectively, are grouted together. The second lens group 14 thus forms a grouted element. The design of the second lens group 14 as a grouted element results in a compact lens structure since only a single lens element has to be moved to correct the spherical aberration.

The third lens group 16 includes, as viewed from the object side, a sixth positive lens 38 with two convex surfaces F13, F14 and a seventh negative lens 40 with two concave surfaces F15, F16, with the image-side surface F14 of the sixth lens 38 and the object-side surface F15 of the seventh lens 40 grouted together.

The fourth lens group 18, as viewed from the object side, comprises an eighth lens 42 with negative refractive power and a concave object-side surface F17 and a convex image-side surface F18 as well as a ninth lens 44 with positive refractive power, a concave object-side surface F19 and a convex image-side surface F20. In the exemplary embodiment shown in FIG. 1, the eighth lens 42 has a chamfer 43 on the object side.

Table 1 shows the lens data of the corrective objective 10 according to FIG. 1. The radius of curvature of each lens surface or the distance to the following surface is stated in mm. Further Table 1 provides the refractive index $n_e$ and Abbe number $v_e$ of the glasses used at a wavelength of 546.073 nm. The surfaces are numbered from the object side. In addition, the reference marks used in FIG. 1 are indicated.

Since the second lens group 14 is movable along the optical axis O, the distances between the lens surfaces F6 and F7 as well as between the lens surfaces F12 and F13 are variable. These distances are marked as V1 or V2 in Table 1. Their sum is constantly 4.11 mm in the exemplary embodiment shown.

TABLE 1

| Area | Reference mark | Radius | Distance | $n_e$ | $v_e$ |
|---|---|---|---|---|---|
| 1 | F1 | infinite | 1.0000 | 1.51872 | 64.0 |
| 2 | F2 | infinite | 1.8959 | | |
| 3 | F3 | −4.5100 | 7.2800 | 1.88815 | 40.5 |
| 4 | F4 | −7.7910 | 0.2000 | | |
| 5 | F5 | 47.1300 | 3.1700 | 1.53019 | 76.6 |
| 6 | F6 | −14.2040 | V1 | | |
| 7 | F7 | 16.4010 | 5.4900 | 1.43985 | 94.5 |
| 8 | F8, F9 | −15.3370 | 4.0000 | 1.64133 | 42.2 |
| 9 | F10, F11 | 11.4780 | 6.0000 | 1.43985 | 94.5 |
| 10 | F12 | −18.5290 | V2 | | |
| 11 | F13 | 23.7720 | 2.9600 | 1.59447 | 68.0 |
| 12 | F14, F15 | −18.1930 | 1.7000 | 1.64133 | 42.2 |
| 13 | F16 | 11.8870 | 5.8900 | | |
| 14 | F17 | −7.1460 | 3.5400 | 1.48914 | 70.2 |
| 15 | F18 | −11.8040 | 1.8300 | | |
| 16 | F19 | −25.3340 | 2.7700 | 1.65391 | 55.6 |
| 17 | F20 | −13.5150 | | | |

By moving the second lens group 14, an operator can correct aberrations, in particular spherical aberrations, caused by variable optical properties within the sample area 26. Particularly variations in the thickness of the cover slip 20 or inhomogeneities in the biological structure of the sample 24 can cause these aberrations.

According to the invention, the second lens group 14 has a magnification between −0.9 and −1.1, such that the position of the second lens group 14 along the optical axis O between the first lens group 12 and the third lens group 16 has a negligible influence on the position of the paraxial focus 22. This enables an operator to correct aberrations by moving the second lens group 14 without significantly changing the position of the paraxial focus 22.

Furthermore, the refractive power $D_2$ of the second lens group 14 is between one tenth and one third of the total refractive power D of the corrective objective 10. To achieve a compact design, particularly a short overall length of the corrective objective 10 without sacrificing the large corrective effect, a high refractive power of the second lens group 14 near the above-mentioned maximum value is advantageous.

Figure 2:
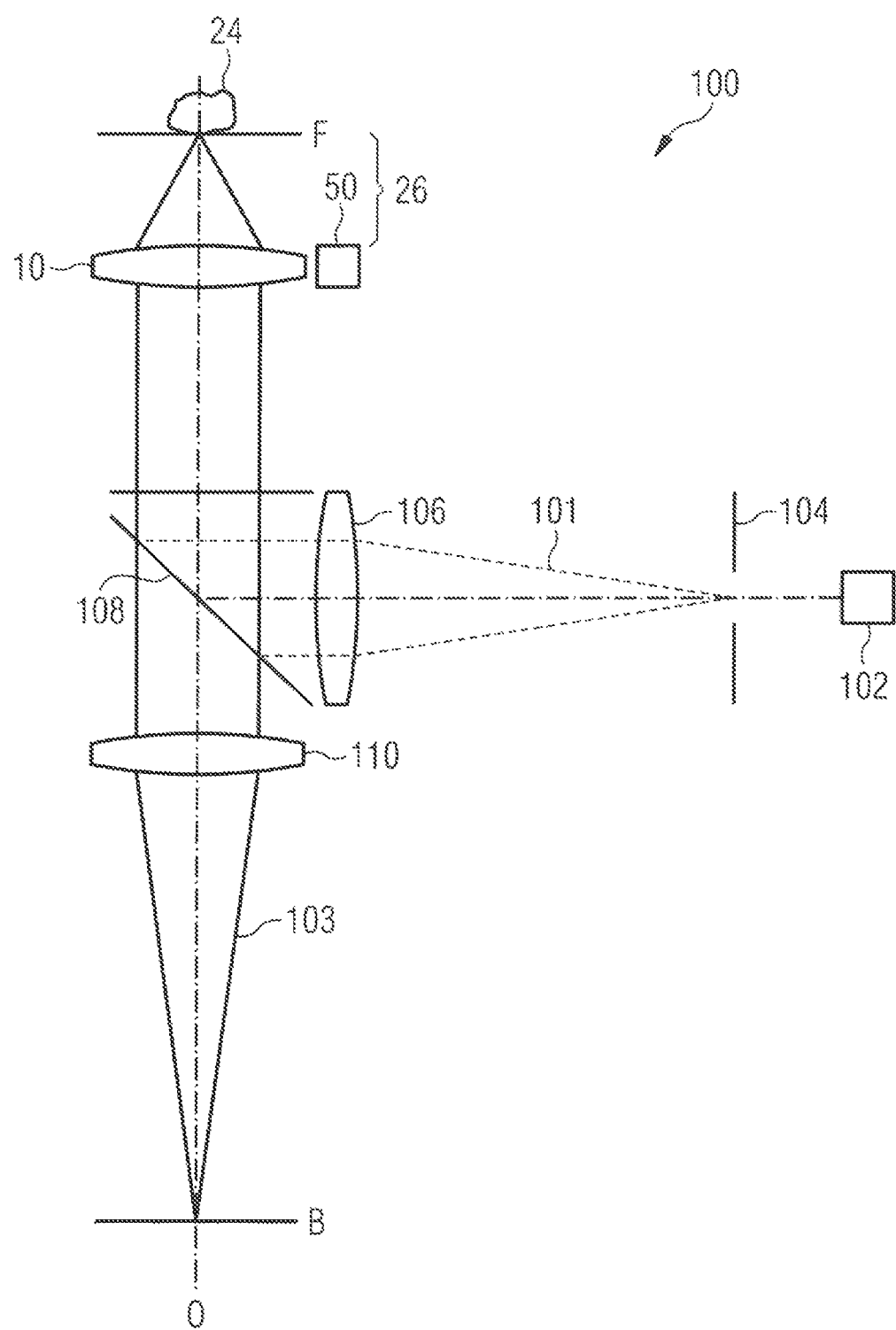
FIG. 2 shows a schematic view of an exemplary embodiment of a reflected light microscope with the corrective objective from FIG. 1.

FIG. 2 is a schematic representation of an exemplary embodiment of a microscope 100 with the corrective objective 10 according to FIG. 1.

A light source 102, a field diaphragm 104, an illumination lens 106, a dichroic splitter mirror 108, and the corrective objective 10 are arranged in the illumination beam path 101 of the microscope 100. The light source 102 emits light, which may in particular be light which prompts the sample 24 to emit fluorescent light. The light is spatially limited by the field diaphragm 104 and, after passing through the illumination lens 106, falls on the dichroic splitter mirror 108. The dichroic splitter mirror 108 is arranged to direct the light onto the corrective objective 10, which then illuminates the sample 24.

Viewed from the object side, the corrective objective 10, the dichroic splitter mirror 108 and a tube lens 110 are arranged in a detection beam path 103 of the microscope 100. The sample 24, which is located in the focal plane F, emits a detection light, which may particularly be fluorescent light. The detection light passes through the corrective objective 10 and falls on the dichroic splitter mirror 108, which transmits the detection light. After passing through the splitter mirror 108, the detection light falls into the tube lens 110, which focuses the detection light onto an image plane B, in which an image of the sample 24 is generated.

The corrective objective 10 features a control element 50, which enables an operator to correct the spherical aberration. The control element 50 can be, for example, a knurling ring with a gear mechanism which moves the second lens group 14, which constitutes the correction member of the corrective objective 10, along the optical axis O when turned to achieve a corrective effect. As already mentioned above, the corrective objective 10 is designed such that the corrective setting of the second lens group 14 leaves the position of the paraxial focus 22 largely unaffected.

LIST OF REFERENCE NUMBERS 10 corrective objective
12 first lens group
14 second lens group
16 third lens group
18 fourth lens group
20 cover slip
22 paraxial focus
24 preparation
26 sample area
28, 30, 32, 34, 36, 38, 40, 42, 44 lenses
29, 43 bevels
F1-F20 lens surfaces
50 control element
100 microscope
101 illumination beam path
102 light source
103 detection beam path
104 field diaphragm
106 illumination lens
108 dichroic splitter mirror
110 tube lens
B image plane
F focal plane
O optical axis

What is claimed is:

1. A corrective objective for a microscope comprising: arranged in a following order from an object side a first lens group of positive refractive power, a second lens group of positive refractive power, a third lens group of negative refractive power, and a fourth lens group of positive refractive power, the second lens group being movable along an optical axis (O) in such a way that a sum of a distance (V1) between the second lens group and the first lens group and a distance (V2) between the second lens group and the third lens group is constant, wherein a magnification of the second lens group is within a range of −0.9 to −1.1, and wherein the refractive power of the second lens group is at least one tenth and at most one third of a total refractive power of the corrective objective.

2. The corrective objective for the microscope according to claim 1, wherein the first lens group comprises a first lens of negative refractive power and a second lens of positive refractive power arranged in this order from the object side.

3. The corrective objective for the microscope according to claim 2, wherein the first lens is a meniscus lens and the second lens is a biconvex lens.

4. The corrective objective for the microscope according to claim 1, wherein the second lens group has a third lens with positive refractive power, a fourth lens with negative refractive power, and a fifth lens with positive refractive power arranged in this order from the object side and grouted together.

5. The corrective objective for the microscope according to claim 4, wherein the third lens and the fifth lens both are biconvex lenses and the fourth lens is a biconcave lens.

6. The corrective objective for the microscope according to claim 1, wherein the third lens group comprises a sixth lens with positive refractive power and a seventh lens with negative refractive power arranged in that order from the object side and grouted together.

7. The corrective objective for the microscope according to claim 6, wherein the sixth lens is a biconvex lens and the seventh lens is a biconcave lens.

8. The corrective objective for a microscope according claim 1, wherein the fourth lens group comprises an eighth lens with negative refractive power and a ninth lens with positive refractive power arranged in that order from the object side.

9. The corrective objective for the microscope according to claim 8, wherein the eighth lens and the ninth lens both are meniscus lenses.

10. The corrective objective for the microscope according to claim 1, further comprising a control element for moving the second lens group along the optical axis (O).

11. A microscope with a corrective objective, the corrective objective comprising:

arranged in a following order from an object side a first lens group of positive refractive power, a second lens group of positive refractive power, a third lens group of negative refractive power, and a fourth lens group of positive refractive power, the second lens group being movable along an optical axis (O) in such a way that a sum of a distance (V1) between the second lens group and the first lens group and a distance (V2) between the second lens group and the third lens group is constant, wherein a magnification of the second lens group is within a range of −0.9 to −1.1, and wherein the refractive power of the second lens group is at least one tenth and at most one third of a total refractive power of the corrective objective.

* * * * *